US012032412B2

United States Patent
Hu et al.

(10) Patent No.: US 12,032,412 B2
(45) Date of Patent: Jul. 9, 2024

(54) FOLDABLE APPARATUS AND ELECTRONIC DEVICE

(71) Applicant: GUANGDONG OPPO MOBILE TELECOMMUNICATIONS CORP., LTD., Guangdong (CN)

(72) Inventors: Tingyong Hu, Guangdong (CN); Zekuan Zheng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 241 days.

(21) Appl. No.: 17/702,499

(22) Filed: Mar. 23, 2022

(65) Prior Publication Data

US 2022/0217228 A1 Jul. 7, 2022

Related U.S. Application Data

(63) Continuation of application No. PCT/CN2020/124255, filed on Oct. 28, 2020.

(30) Foreign Application Priority Data

Oct. 29, 2019 (CN) .......................... 201911041319.8

(51) Int. Cl.
G06F 1/16 (2006.01)
H04M 1/02 (2006.01)

(52) U.S. Cl.
CPC .......... G06F 1/1652 (2013.01); G06F 1/1681 (2013.01); H04M 1/0268 (2013.01); H04M 1/0214 (2013.01); H04M 1/0235 (2013.01)

(58) Field of Classification Search
CPC .. G06F 1/1652; G06F 1/1681; H04M 1/0268; H04M 1/0214; H04M 1/0235; H04M 1/022
See application file for complete search history.

(56) References Cited

U.S. PATENT DOCUMENTS 9,348,450 B1 * 5/2016 Kim ................... H04M 1/0268
10,761,574 B1 * 9/2020 Hsu ....................... G06F 1/1626
(Continued)

FOREIGN PATENT DOCUMENTS

CN 104836865 A 8/2015
CN 106205385 A 12/2016
(Continued)

OTHER PUBLICATIONS

China First Office Action with English Translation issued in corresponding CN application No. 201911041319.8 dated Aug. 4, 2020.
(Continued)

Primary Examiner — Nidhi Thaker
(74) Attorney, Agent, or Firm — Young Basile Hanlon & MacFarlane, P.C.

(57) ABSTRACT

A foldable apparatus and an electronic device are provided in the present disclosure. The foldable apparatus includes a rotating shaft base and two main bodies. Each main body is provided with a rotating member rotatably connected with the rotating shaft base, a housing rotatably connected with the rotating member, a first support plate fixed to the housing, and a second support plate fixedly connected with the rotating member. When the two main bodies are folded relative to each other, the second support plate rotates relative to the housing along with the rotating member to be inclined relative to the first support plate, and an accommodating space is defined between two second support plates. When the two main bodies are unfolded relative to each other, the second support plate rotates relative to the housing along with the rotating member to be flush with the first support plate.

19 Claims, 6 Drawing Sheets

(56) References Cited

U.S. PATENT DOCUMENTS

| | | | | |
|---|---|---|---|---|
| 11,073,863 B2* | 7/2021 | Kim | .................. | G06F 1/1656 |
| 11,194,366 B2* | 12/2021 | Cheng | ................. | G06F 1/1652 |
| 11,223,710 B2* | 1/2022 | Cheng | ................. | H04M 1/0268 |
| 11,792,946 B2* | 10/2023 | Park | .................. | H05K 5/0017 |
| | | | | 361/679.01 |
| 2013/0021762 A1* | 1/2013 | van Dijk | ............. | G09F 9/301 |
| | | | | 361/749 |
| 2015/0366089 A1* | 12/2015 | Park | .................. | G06F 1/1641 |
| | | | | 361/679.01 |
| 2016/0302314 A1* | 10/2016 | Bae | .................. | G06F 1/16 |
| 2017/0192460 A1 | 7/2017 | Watanabe et al. | | |
| 2018/0032108 A1* | 2/2018 | Park | .................. | G06F 1/1656 |
| 2019/0208649 A1* | 7/2019 | Jeon | .................. | H05K 5/0217 |

FOREIGN PATENT DOCUMENTS

| | | |
|---|---|---|
| CN | 106255935 A | 12/2016 |
| CN | 107165927 A | 9/2017 |
| CN | 109488681 A | 3/2019 |
| CN | 208651418 U | 3/2019 |
| CN | 208656822 U | 3/2019 |
| CN | 107165927 B | 7/2019 |
| CN | 109488681 B | 6/2020 |
| EP | 2696257 A2 | 2/2014 |
| EP | 4033740 A1 | 7/2022 |
| KR | 101731375 B1 | 4/2017 |
| KR | 20180010019 A | 1/2018 |
| TW | 201921222 A | 6/2019 |

OTHER PUBLICATIONS

Notification to Grant Patent Right for Invention with English Translation issued in corresponding CN application No. 201911041319.8 dated Feb. 1, 2021.

International search report with English Translation issued in corresponding international application No. PCT/CN2020/124255 dated Feb. 1, 2021.

Extended European Search Report for EP Application 20883312.9 mailed Oct. 20, 2022. (11 pages).

* cited by examiner

FOLDABLE APPARATUS AND ELECTRONIC DEVICE

CROSS-REFERENCE TO RELATED APPLICATION(S)

This application is a continuation application of International Application No. PCT/CN2020/124255, filed on Oct. 28, 2020, which claims priority to Chinese Patent Application No. 201911041319.8, filed on Oct. 29, 2019, the entire disclosure of both of which are incorporated herein by reference.

TECHNICAL FIELD

This disclosure relates to the field of communication devices, and in particular to a folding apparatus and an electronic device.

BACKGROUND

At present, in a foldable mobile phone, a display screen of a mobile phone is folded in half to realize miniaturization of the mobile phone and facilitate a user to carry the mobile phone. However, at present, during a folded process of the display screen, a bendable part of the display screen has a bending radius, such that the display screen is unable to be completely folded, two main bodies of the foldable mobile phone connected with two opposite parts of the display screen are unable to be completely folded.

SUMMARY

A foldable apparatus is provided in implementations of the present disclosure, where the foldable apparatus includes a rotating shaft base and two main bodies disposed at two opposite sides of the rotating shaft base. Each main body is provided with a rotating member rotatably connected with the rotating shaft base, a housing rotatably connected with the rotating member, a first support plate fixed to the housing, and a second support plate fixedly connected with the rotating member. When the two main bodies are folded relative to each other, two housings respectively drive two first support plates to stack relative to each other, and the second support plate rotates relative to the housing along with the rotating member to be inclined relative to the first support plate, and an accommodating space is defined between two second support plates. When the two main bodies are unfolded relative to each other, the two housings respectively drive the two first support plates to be flush with each other, and the second support plate rotates relative to the housing along with the rotating member to be flush with the first support plate.

An electronic device is provided in implementations of the present disclosure, where the electronic device includes a foldable apparatus and a flexible display screen. The foldable apparatus includes a rotating shaft base and two main bodies disposed at two opposite sides of the rotating shaft base, each main body is provided with a rotating member rotatably connected with the rotating shaft base, a housing rotatably connected with the rotating member, a first support plate fixed to the housing, and a second support plate fixedly connected with the rotating member. The flexible display screen has two parts which are able to be folded or unfolded relatively to each other and a bendable part connected between the two parts, and the two parts are respectively fixed to the two main bodies. When the two main bodies are folded relative to each other, two housings respectively drive two first support plates to stack relative to each other, and the second support plate rotates relative to the housing along with the rotating member to be inclined relative to the first support plate, and an accommodating space is defined between two second support plates. When the two main bodies are unfolded relative to each other, the two housings respectively drive the two first support plates to be flush with each other, and the second support plate rotates relative to the housing along with the rotating member to be flush with the first support plate. When the two main bodies are folded relative to each other, the two first support plates respectively drive the two parts to fold, and the bendable part is accommodated in the accommodating space between the two second support plates.

BRIEF DESCRIPTION OF DRAWINGS

In order to describe technical solutions of the disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Technical solutions of implementations of the present disclosure will be described clearly and completely, with reference to accompanying drawings in the implementations of the present disclosure.

Figure 1:
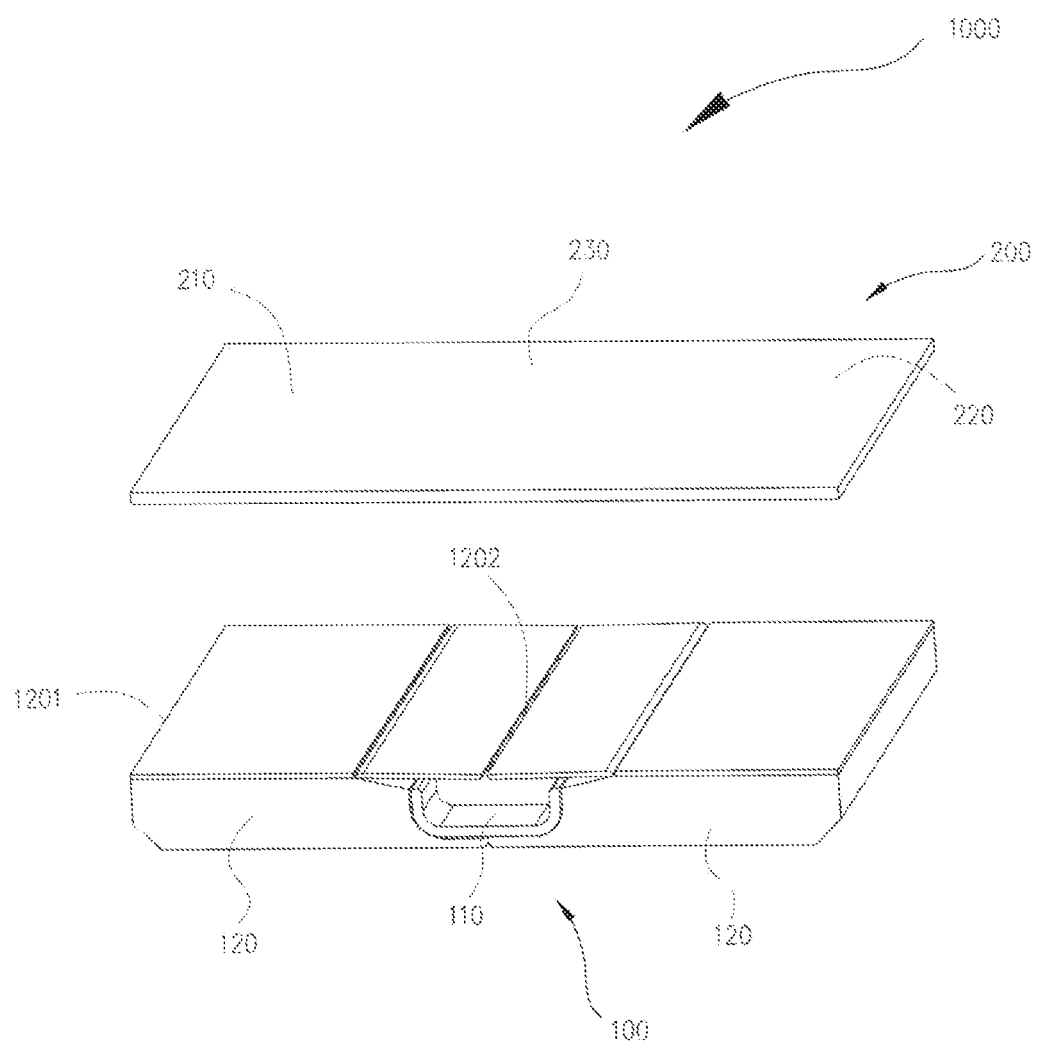
FIG. 1 is an exploded schematic view illustrating an electronic device provided in implementations of the present disclosure.
Figure 2:
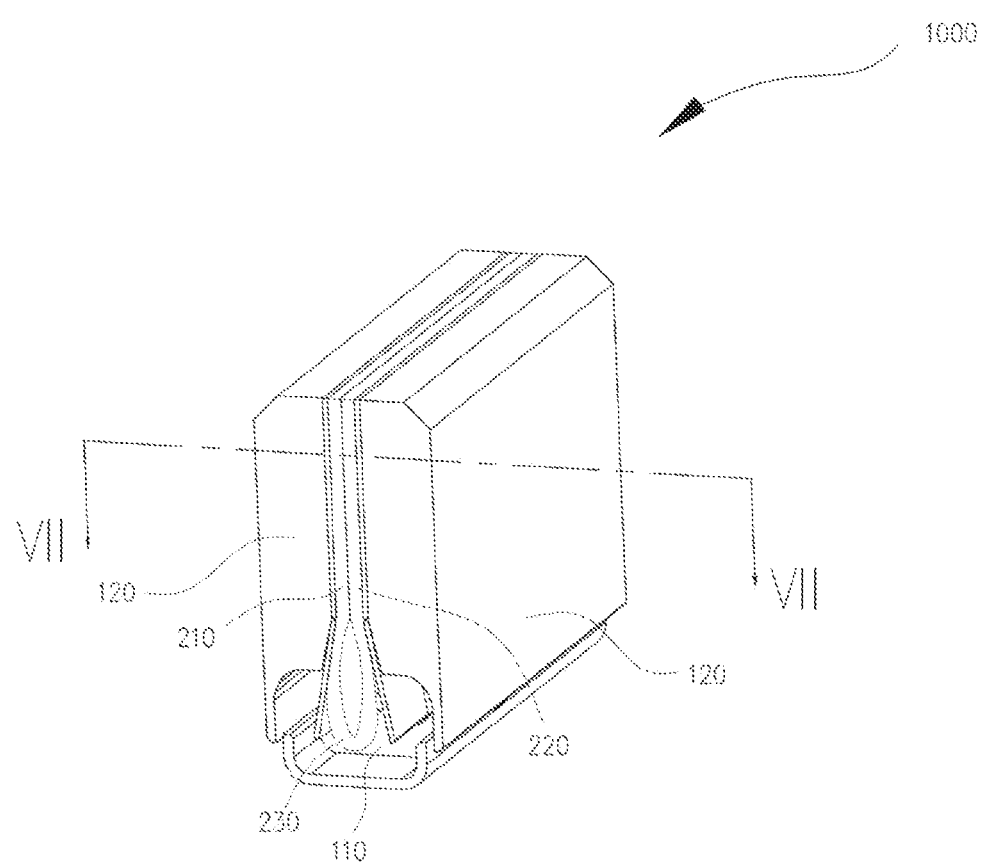
FIG. 2 is a schematic view illustrating a folded state of an electronic device provided in implementations of the present disclosure.
Figure 3:
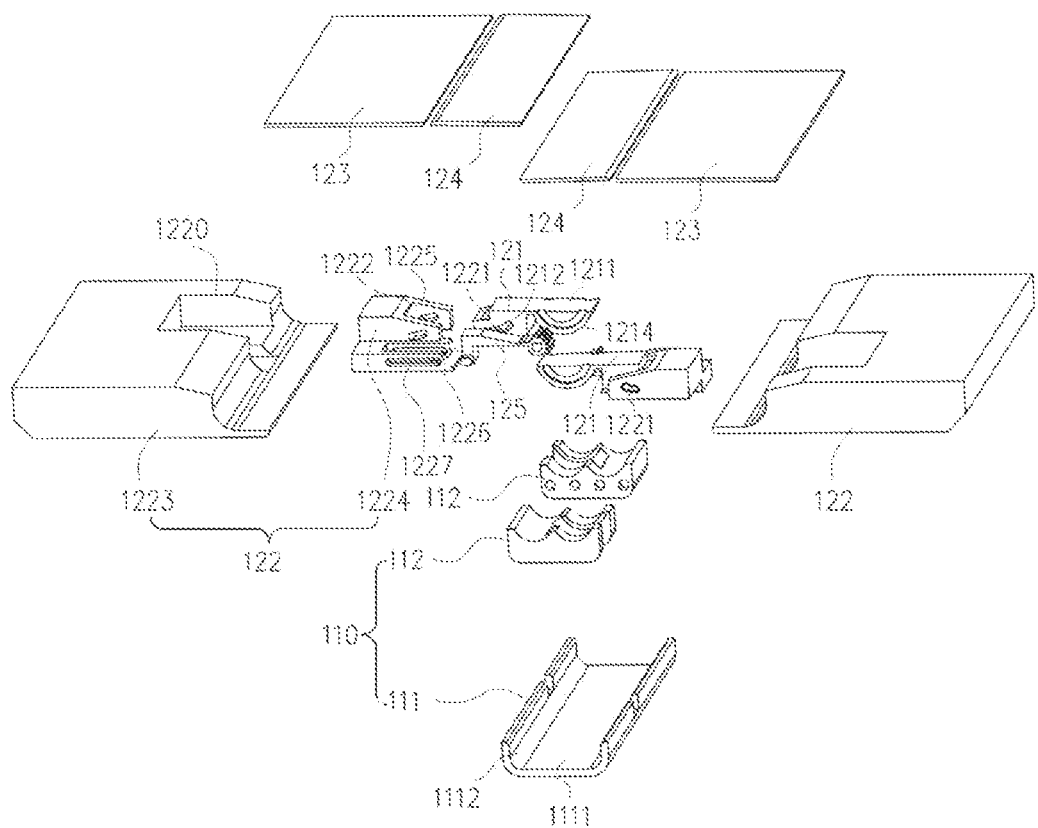
FIG. 3 is an exploded schematic view illustrating an unfolded state of an electronic device provided in implementations of the present disclosure.

Reference can be made to FIG. 1, FIG. 2, and FIG. 3, an electronic device 1000 is provided in the present disclosure, and the electronic device 1000 includes a foldable apparatus 100 and a flexible display screen 200. The flexible display screen 200 has a first part 210, a second part 220 folded or unfolded relative to the first part 210, and a bendable part 230 connected between the first part 210 and the second part 220. The foldable apparatus 100 includes a rotating shaft base 110 and two main bodies 120 disposed at two opposite sides of the rotating shaft base 110. The two main bodies 120 can rotate relative to the rotating shaft base 110, which realizes that that the two main bodies 120 can respectively drive the first part 210 and the second part 220 to fold or unfold relative to each other.

Each main body 120 is provided with a rotating member 121 rotatably connected with the rotating shaft base 110, a housing 122 rotatably connected with the rotating member 121, a first support plate 123 fixed to the housing 122, and a second support plate 124 fixedly connected with the rotating member 121. When the two main bodies 120 are folded relative to each other, two housings 122 respectively drive two first support plates 123 to stack relative to each other, and the second support plate 124 rotates relative to the housing 122 along with the rotating member 121 to be inclined relative to the first support plate 123, and an accommodating space is defined between two second support plates 124. When the two main bodies 120 are unfolded relative to each other, the two housings 122 respectively drive the two first support plates 123 to be flush with each other, and the second support plate 124 rotates relative to the housing 122 along with the rotating member 121 to be flush with the first support plate 123.

It can be understood that the two main bodies 120 can respectively carry the first part 210 and the second part 220. The two main bodies 120 rotate relative to the rotating shaft base 110 to drive the first part 210 and/or the second part 220 to rotate relative to the rotating shaft base 110, such that the first part 210 and the second part 220 are folded or unfolded relative to each other, and an electronic device 1000 can present two usage states of being folded or being unfolded. The electronic device 1000 may be a mobile phone, a tablet computer, a notebook computer, or other devices.

Each main body 120 of the foldable apparatus 100 is provided with the first support plate 123 and the second support plate 124 which is able to rotate relative to the first support plate 123, and when the two main bodies 120 are folded relative to each other, the two first support plates 123 can be overlapped with each other, while the second support plate 124 is inclined relative to the first support plate 123, and the accommodating space is defined between the two second support plates 124 and can be used to accommodate the bendable part 230, such that an overall thinness of the foldable apparatus 100 can be reduced in a folded state.

In this implementation, the rotating shaft base 110 has two side portions rotatably connected with the two main bodies 120 respectively. The rotating shaft base 110 substantially has a rotating shaft structure of the two main bodies 120, such that the two main bodies 120 can rotate relative to each other through the rotating shaft base 110. The rotating shaft base 110 is in a rectangular rod shape. The rotating shaft base 110 is provided with a rotating shaft housing 111 and a bearing assembly 112 fixed in the rotating shaft housing 111. The bearing assembly 112 is in rotating fit with rotation axes of the two main bodies 120 respectively. The rotating shaft housing 111 is configured to stabilize and protect the bearing assembly 112. The rotating shaft housing 111 has a rotating-shaft bottom plate 1111 and two side plates 1112 fixed to the two opposite long edges of the rotating-shaft bottom plate 1111. When the two main bodies 120 are folded relative to each other, the two main bodies 120 are substantially spliced with the two side plates 1112 respectively, such that the rotating shaft housing 111 substantially protects the bendable part 230 of the flexible display screen 200. When the two main bodies 120 are unfolded relative to each other, the two main bodies 120 are substantially spliced and substantially cover the rotating shaft housing 111 to simplify an appearance structure of the electronic device 1000 in a folded state.

In this implementation, the main body 120 has a first edge 1201 and a second edge 1202 opposite to the first edge 1201, and the second edge 1202 is adjacent to the rotating shaft base 110. The first edge 1201 extends along a central axis parallel to a length direction of the rotating shaft base 110. The second edge 1202 is parallel to the first edge 1201. The first edges 1201 of the two main bodies 120 may be fixedly connected with an edge of the first part 210 and an edge of the second part 220 respectively. The first edges of the two main bodies 120 may also be slidably connected with the edge of the first part 210 and the edge of the second part 220 respectively. When the second support plate 124 rotates relative to the first support plate 123 to be flush with the first support plate 123, the main body 120 can effectively and stably support the first part 210 of the flexible display screen 200. When the second support plate 124 rotates relative to the first support plate 123 to be inclined relative to the first support plate 123, the second support plate 124 can retract toward a bottom of the main body 120, such that the accommodating space can be defined by yielding of the second support plates 124, thus the bendable part 230 of a folded flexible display screen 200 is accommodated in the accommodating space.

In this implementation, the first support plate 123 and the second support plate 124 can cover the housing 122 together. The first support plate 123 is adjacent to the first edge 1201 of the housing 122, and the second support plate 124 is adjacent to the second edge 1202 of the housing 122. When the second support plate 124 is inclined relative to the first support plate 123, an edge of the second support plate 124 away from the first support plate 123 rotatably retract toward an inner side of the housing 122. When the two first support plates 123 are in a folded state, edges of the two second support plates 124 close to the first support plates 123 are close to each other, while edges of the two second support plates 124 away from the two first support plates 123 are away from each other, such that the accommodating space substantially in a shape of a triangular column can be defined between the two second support plates 124, which facilitates the bendable part 230 of the flexible display screen 200 being accommodated between the two second support plates 124, facilitates a compensation for a bending radius of the bendable part 230 of the flexible display screen 200 when the electronic device 1000 is in a folded state, and ensures safety of the flexible display screen 200. When the two second support plates 124 are flush with each other, the two second support plates 124 are spliced with each other and can substantially cover the rotating shaft base 110, such that a middle bendable part 230 of the flexible display screen 200 in an unfolded state can be effectively stabilized at a position where the two second support plates 124 are spliced with each other.

In this implementation, the rotating member 121 is fixed to a side of the second support plate 124 facing the housing 122. The rotating member 121 has a connecting end portion 1211 protruding relative to the second support plate 124, and the connecting end portion 1211 is rotatably connected with the rotating shaft base 110. A part of the rotating member 121 fixedly connected with the second support plate 124 can be rotatably connected with the housing 122, so as to realize that the second support plate 124 can rotate relative to the first support plate 123 through the rotating member 121. A rotation-axis line of the connecting end portion 1211 is set to be parallel to the second edge 1202, such that the two main bodies 120 can be unfolded or folded relative each other. The main body 120 may be provided with multiple rotating members 121 arranged at regular intervals in a length direction of the second edge 1202. The rotating members 121 of the two main bodies 120 may be rotatably connected with a same rotating shaft of the rotating shaft base 110, or rotatably connected with different rotating shafts of the rotating shaft base 110 respectively. On the rotating shaft base 110, the rotating members 121 of the two main bodies 120 may be symmetrically arranged along a central axis in a length direction of the rotating shaft base 110, or arranged in alternation along the central axis in the length direction of the rotating shaft base 110.

Figure 6:
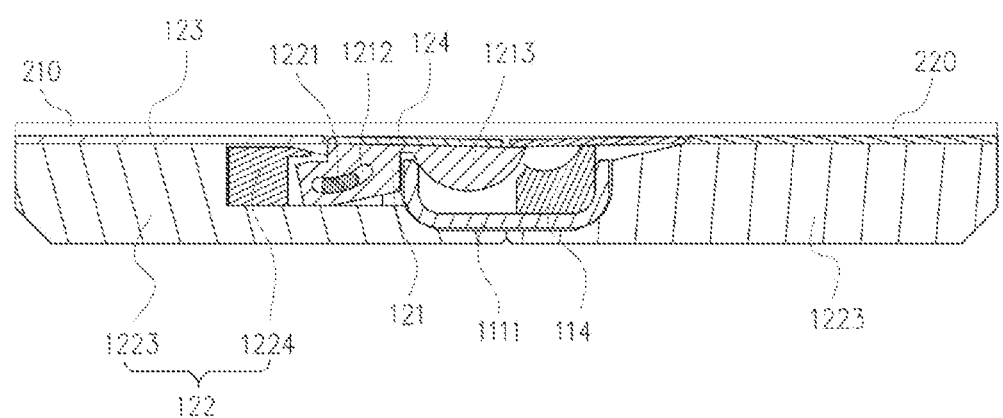
FIG. 6 is a schematic cross-sectional view illustrating the electronic device of FIG. 4, taken along VI-VI.
Figure 7:
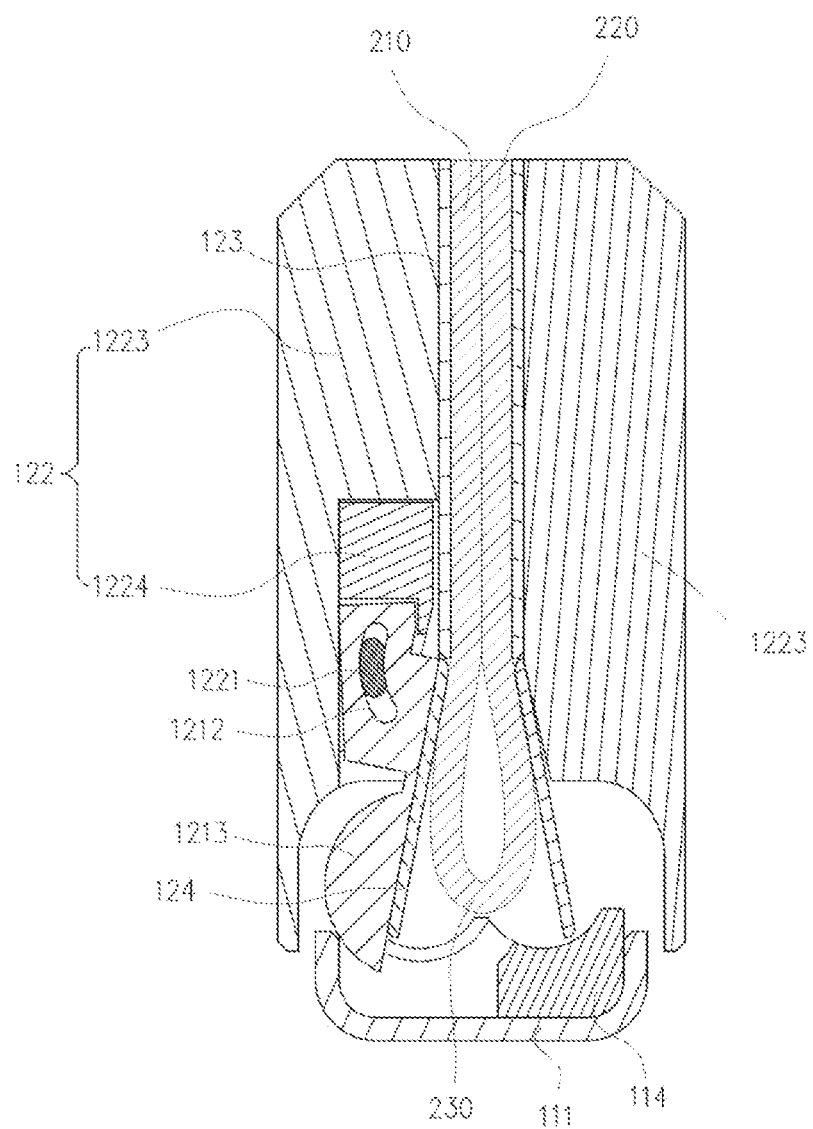
FIG. 7 is a schematic cross-sectional view illustrating the electronic device of FIG. 2, taken along VII-VII.

Furthermore, reference can be made to FIG. 3, FIG. 6, and FIG. 7 together. The housing 122 is provided with a rotating limit pin 1221, the rotating member 121 defines a curved sliding groove 1212, a circular arc center of the curved sliding groove 1212 is at a boundary between the first support plate 123 and the second support plate 124, and the rotating limit pin 1221 can be in sliding fit with the curved sliding groove 1212 to drive the rotating member 121 to rotate relative to the housing 122.

In this implementation, the rotating limit pin 1221 is disposed at the housing 122 away from the first edge 1201. A length direction of the rotating limit pin 1221 is substantially parallel to a rotation-axis direction of the rotating member 121. The curved sliding groove 1212 is defined at a part of the rotating member 121 fixedly connected with the second support plate 124. The curved sliding groove 1212 extends along a circular arc curve. The rotating limit pin 1221 has two opposite curved mating surfaces, and the curved sliding groove 1212 has two curved guide surfaces respectively in fit with the two curved mating surfaces. The rotating limit pin 1221 is slidably disposed along the curved sliding groove 1212, such that the housing 122 and the first support plate 123 can rotate relative to the rotating member 121 and the second support plate 124. A center of the circular arc curve in an extension direction of the curved sliding groove 1212 is at the boundary between the first support plate 123 and the second support plate 124, such that the second support plate 124 can take an edge of the second support plate 124 close to the first support plate 123 as a rotation axis to rotate relative to the first support plate 123. The curved sliding groove 1212 has two opposite closed ends which are configured to limit the rotating limit pin 1221, so as to limit a rotation angle of the second support plate 124 relative to the first support plate 123, which prevents the flexible display screen 200 from being damaged due to an excessive rotation angle of the second support plate 124 relative to the first support plate 123. Of course, in other implementations, the housing 122 may define the curved sliding groove 1212 and the rotating member 121 may be provided with the rotating limit pin 1221, to realize that the rotating member 121 can rotate relative to the housing 122.

Figure 4:
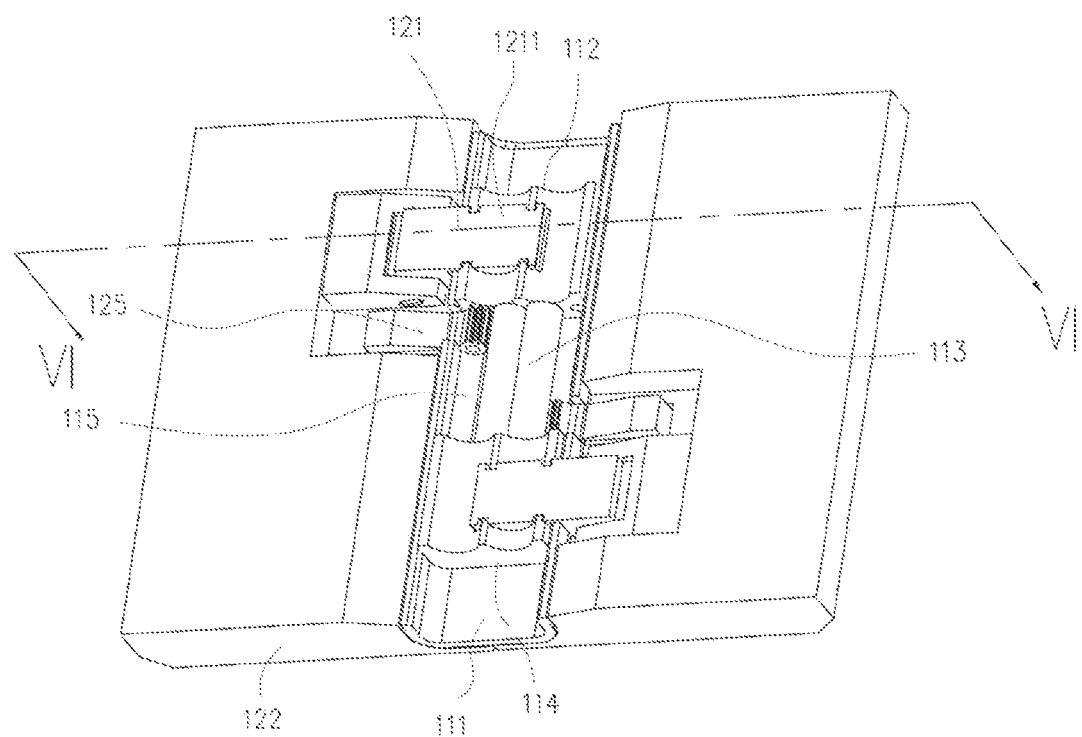
FIG. 4 is a partial schematic view illustrating an unfolded state of an electronic device provided in implementations of the present disclosure.
Figure 5:
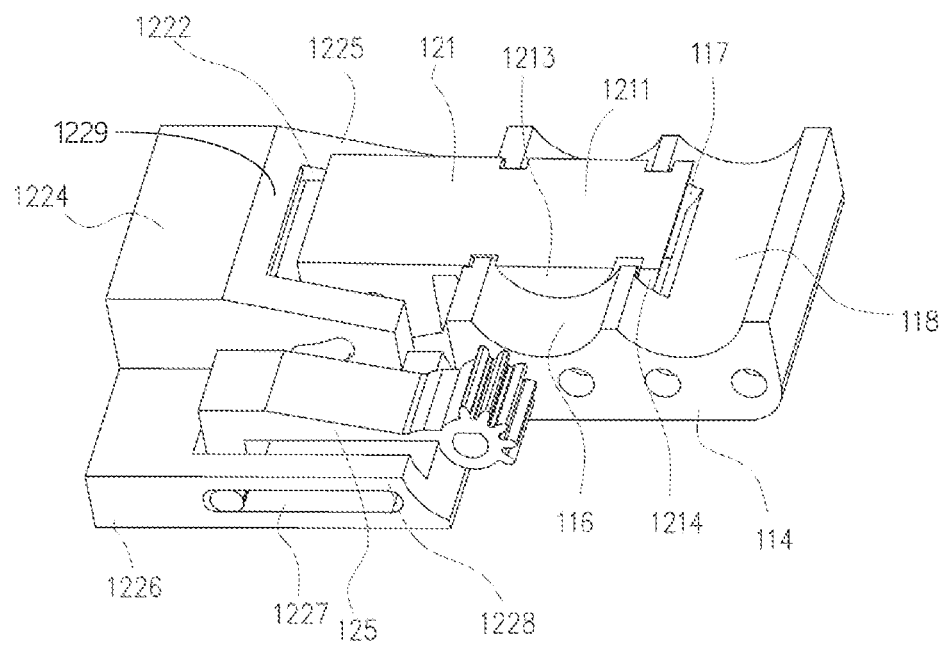
FIG. 5 is a partial schematic view illustrating an electronic device provided in implementations of the present disclosure.

Furthermore, reference can be made to FIG. 3, FIG. 4, and FIG. 5 together. The housing 122 defines an accommodating groove 1222, an end of the rotating member 121 is accommodated in the accommodating groove 1222, the rotating limit pin 1221 penetrates through the accommodating groove 1222, and the curved sliding groove 1212 is defined in an end of the rotating member 121 accommodated in the accommodating groove 1222.

In this implementation, an opening direction of the accommodating groove 1222 is substantially perpendicular to the length direction of the rotating limit pin 1221. The accommodating groove 1222 has two opposite mating inner walls which are in clearance fit with two outer walls of the end of the rotating member 121 to limit the rotating member 121, which prevents the rotating member 121 from moving laterally in the length direction of the rotating limit pin 1221. Two ends of the rotating limit pin 1221 respectively penetrate through the two mating inner walls, such that structures of the rotating member 121 and the housing 122 are stable.

Specifically, the housing 122 includes a back housing 1223 and a housing connecting member 1224 fixed in the back housing 1223, the first support plate 123 covers the back housing 1223 and partially covers the housing connecting member 1224, the accommodating groove 1222 is defined in the housing connecting member 1224, and the rotating member 121 is rotatably connected with the housing connecting member 1224. The back housing 1223 defines a fixed groove 1220, and the housing connecting member 1224 is fixed in the fixed groove 1220. The housing 122 may be provided with multiple housing connecting members 1224, and each housing connecting member 1224 is rotatably connected with each rotating member 121. The multiple housing connecting members 1224 may be arranged at regular intervals along an edge of the first support plate 123. The back housing 1223 covers the first support plate 123, an accommodating space can be defined between the back housing 1223 and the first support plate 123, and the accommodating space can be used to accommodate a functional device, which may be a mainboard, an antenna, a speaker, a camera, etc. The housing connecting member 1224 is fixed in the accommodating space and an end of the housing connecting member 1224 protrudes relative to the edge of the first support plate 123, to facilitate the housing connecting member 1224 being rotatably connected with the rotating member 121. In other words, the accommodating groove 1222 and the rotating limit pin 1221 are both disposed at the end of the housing connecting member 1224 protruding relative to the first support plate 123.

More specifically, the housing connecting member 1224 has two opposite fixed plates 1225, the accommodating groove 1222 is defined between the two fixed plates 1225, the two ends of the rotating limit pin 1221 are respectively fixed to the two fixed plates 1225, and the fixed plates 1225 are in clearance fit with the rotating member 121. The mating inner walls are disposed at the fixed plate 1225. The two ends of the rotating limit pin 1221 respectively penetrate through the two fixed plates 1225, and the rotating limit pin 1221 can be detachably connected with the two fixed plates 1225. The end of the housing connecting member 1224 protruding relative to the edge of the first support plate 123 has an inclined mating surface 1229. When the second support plate 124 rotates relative to the first support plate 123 to an inclined state, the second support plate 124 is substantially in fit with the inclined mating surface 1229, to facilitate rotation of the second support plate 124 relative to the first support plate 123 and improve stability of the second support plate 124 and the housing connecting member 1224.

Furthermore, each main body 120 is further provided with a limit connecting member 125 rotatably connected with the rotating shaft base 110 and slidably connected with the housing 122, and two limit connecting members 125 are configured to respectively limit rotation of the two main bodies 120 within an included angle range which is from being folded to being unfolded relative to each other.

In this implementation, the limit connecting member 125 is configured to limit a rotation angle of the main body 120 relative to the rotating shaft base 110, such that the main body 120 rotates relative to the rotating shaft base 110 within a certain included angle range. The rotation angle of the main body 120 relative to the rotating shaft base 110 is approximately within an included angle range of 90 degrees. When the two main bodies 120 rotate to a state of a minimum included angle, the two main bodies 120 are substantially folded relative to each other, and the first part 210 and the second part 220 of the flexible display screen 200 can be attached to each other to reduce an overall thickness of the flexible display screen 200 in a folded state. When the two main bodies 120 rotate to a state of a maximum included angle, the two main bodies 120 are substantially unfolded relative to each other, such that the flexible display screen 200 is tiled on the two main bodies 120, and the limit connecting members 125 limit the two main bodies 120 to continuously unfold to prevent the flexible display screen 200 from being damaged. A rotation axis of the limit connecting member 125 configured to rotate relative to the rotating shaft base 110 and a rotation axis of the rotating member 121 being connected with the rotating shaft base 110 are not coaxially disposed, so as to ensure that the limit connecting member 125 can effectively limit a rotation angle of the housing 122.

Specifically, a limiting boss 1226 extends from a side of the housing connecting member 1224. The limiting boss 1226 defines a limit sliding groove 1227 extending linearly, and an extension direction of the limit sliding groove 1227 is substantially parallel to the first support plate 123. One end of the limit connecting member 125 is in sliding fit with the limit sliding groove 1227, and the other end of the limit connecting member 125 is rotatably connected with the rotating shaft base 110. The limit sliding groove 1227 has two closed limiting ends, and when one end of the limit connecting member 125 slides to one limiting end, the two main bodies 120 rotate relative to each other to a folded state or an unfolded state. The limiting boss 1226 has two opposite limiting plates 1228, and an accommodating groove is defined between the two limiting plates 1228. The limit sliding groove 1227 is defined in the limiting plate 1228, an end of the limit connecting member 125 can be accommodated in the accommodating groove, and the end of the limit connecting member 125 has a sliding column which is in sliding fit with the limit sliding groove 1227. The limiting boss 1226 is connected with the limit connecting member 125, such that the limit connecting member 125 and the rotating member 121 can be staggered relative to each other, and the main body 120 can smoothly rotate relative to the rotating shaft base 110, in addition, a thickness of the main body 120 can be reduced, and the limit connecting member 125 is avoided to be stacked with the rotating member 121 in a direction perpendicular to the flexible display screen 200. Of course, in other implementations, the limit connecting member 125 may define the limit sliding groove 1227, and the housing connecting member 1224 is provided with a sliding block which is in sliding fit with the limit sliding groove 1227.

Furthermore, reference can be made to FIG. 4, FIG. 6, and FIG. 7 together, the rotating shaft base 110 is provided with a synchronous transmission assembly 113, and the synchronous transmission assembly 113 is connected with the two limit connecting members 125 to enable the two main bodies 120 to synchronously rotate relative to the rotating shaft base 110.

In this implementation, the synchronous transmission assembly 113 is provided with a synchronous transmission gearset, and the synchronous transmission gearset is connected with the two limit connecting members 125 to enable the two limit connecting members 125 to synchronously rotate relative to the rotating shaft base 110. Of course, the synchronous transmission assembly 113 may be provided with a synchronous transmission linkage to realize synchronous rotation of the two limit connecting members 125 relative to the rotating shaft base 110.

Specifically, the rotating shaft base 110 is provided with two bearing blocks 114, the rotating members 121 of the two main bodies 120 are rotatably connected with the two bearing blocks 114 respectively, a gap 115 is defined between the two bearing blocks 114, an end of the limit connecting member 125 rotatably connected with the rotating shaft base 110 is located within the gap 115, and the synchronous transmission assembly 113 is located within the gap 115. A bearing block 114 defines a rotating shaft groove 116, and the rotating shaft groove 116 defines a rotating guide groove 117 at an inner wall of the rotating shaft groove 116. The rotating member 121 has a rotating wheel 1213 at an end of the rotating member 121 away from the housing 122, and the rotating wheel 1213 is in rotating fit with the rotating shaft groove 116. The rotating wheel 1213 has a rotating guide flange 1214 at an outer wall of the rotating wheel 1213 and in fit with the rotating guide groove 117. The rotating shaft groove 116 of the bearing block 114 is in fit with the rotating wheel 1213 of the rotating member 121, such that rotation angle of the rotating member 121 relative to the rotating shaft base 110 can be greater than 90 degrees, edges of the two second support plates 124 close to the first support plates 123 can be close to each other, and the accommodating space can be defined between the two second support plates 124. The rotating guide groove 117 is in fit with the rotating guide flange 1214 to prevent the rotating wheel 1213 from disengaging with the rotating shaft base 110 and to increase smoothness of rotation of the rotating member 121 relative to the rotating shaft base 110.

In this implementation, the second support plate 124 is substantially stacked with the rotating wheel 1213, while two rotating wheels 1213 are staggered relative to each other, such that a distance between the two rotating wheels 1213 can be effectively reduced. When the two main bodies 120 are unfolded relative to each other, the two second support plates 124 are closer to each other, in other words, the two second support plates 124 are substantially spliced with each other. During a folded process of the two main bodies 120 from an unfolded state to a folded state, the rotating wheel 1213 rotates in a direction of rotating out of the rotating shaft groove 116, and an edge of the second support plate 124 away from the first support plate 123 can slide relative to the rotating shaft base 110 along the inner wall of the rotating shaft groove 116, such that the edge of the second support plate 124 away from the first support plate 123 can retract toward a bottom of the rotating shaft base 110, and a larger accommodating space can be defined between the two second support plates 124 to accommodate the bendable part 230 of the flexible display screen 200.

More specifically, the rotating members 121 of the two main bodies 120 are arranged in alternation at two opposite sides of the rotating shaft base 110, the rotating shaft base 110 defines avoiding grooves 118 each at one side of a corresponding rotating shaft groove 116 facing a main body 120 at another side, and the avoiding groove 118 is for the edge of the second support plate 124 away from the first support plate 123 to retract relative to the bottom of the rotating shaft base 110. The avoiding groove 118 is defined at the bearing block 114 and is side by side with the rotating shaft groove 116. Each rotating guide groove 117 communicates with a corresponding avoiding groove 118, such that structures of the rotating shaft groove 116 and the avoiding groove 118 on the bearing block 114 are more compact, a volume of the rotating shaft base 110 is reduced, and the electronic device 1000 can be thinner. A geometrically central axis of the avoiding groove 118 is coaxial with a geometrically central axis of the rotating shaft groove 116 of another bearing block 114, and an inner diameter of the avoiding groove 118 is substantially the same as an inner diameter of the rotating shaft groove 116 of another bearing block 114. Of course, in other implementations, the avoiding groove 118 may also be a rectangular groove.

Each main body 120 of the foldable apparatus 100 is provided with the first support plate 123 and the second support plate 124 which is able to rotate relative to the first support plate 123, and when the two main bodies 120 are folded relative to each other, the two first support plates 123 can be overlapped with each other, while the second support plate 124 is inclined relative to the first support plate 123, and the accommodating space is defined between the two second support plates 124 and can be used to accommodate a bendable part of a display screen, such that the overall thinness of the foldable apparatus 100 can be reduced in a folded state.

The above are the preferable implementations of the present disclosure. It should be noted that, for those of ordinary skill in the art, without departing from a concept of the present disclosure, several modifications and improvements can be made, and these modifications and improvements are also regard as the protection scope of the present disclosure.

What is claimed is:

1. A foldable apparatus, comprising:
a rotating shaft base; and
two main bodies disposed at two opposite sides of the rotating shaft base, wherein each main body is provided with a rotating member rotatably connected with the rotating shaft base, a housing rotatably connected with the rotating member, a first support plate fixed to the housing, and a second support plate fixedly connected with the rotating member;
when the two main bodies are folded relative to each other, two housings respectively drive two first support plates to stack relative to each other, and the second support plate rotates relative to the housing along with the rotating member to be inclined relative to the first support plate, and an accommodating space is defined between two second support plates; and
when the two main bodies are unfolded relative to each other, the two housings respectively drive the two first support plates to be flush with each other, and the second support plate rotates relative to the housing along with the rotating member to be flush with the first support plate;
wherein each main body is further provided with a limit connecting member rotatably connected with the rotating shaft base and slidably connected with the housing, and two limit connecting members are configured to respectively limit rotation of the two main bodies within an included angle range which is from being folded to being unfolded relative to each other.

2. The foldable apparatus of claim 1, wherein the housing is provided with a rotating limit pin, the rotating member defines a curved sliding groove, a circular arc center of the curved sliding groove is at a boundary between the first support plate and the second support plate, and the rotating limit pin is in sliding fit with the curved sliding groove to drive the rotating member to rotate relative to the housing.

3. The foldable apparatus of claim 2, wherein the curved sliding groove has two opposite closed ends, and the two closed ends are configured to limit the rotating limit pin to limit a rotation angle of the second support plate relative to the first support plate.

4. The foldable apparatus of claim 2, wherein the housing defines an accommodating groove, an end of the rotating member is accommodated in the accommodating groove, the rotating limit pin penetrates through the accommodating groove, and the curved sliding groove is defined in the end of the rotating member accommodated in the accommodating groove.

5. The foldable apparatus of claim 4, wherein the housing comprises a back housing and a housing connecting member fixed in the back housing, the first support plate covers the back housing and partially covers the housing connecting member, the accommodating groove is defined in the housing connecting member, and the rotating member is rotatably connected with the housing connecting member.

6. The foldable apparatus of claim 5, wherein the housing connecting member has two opposite fixed plates, the accommodating groove is defined between the two fixed plates, two ends of the rotating limit pin are respectively fixed to the two fixed plates, and the fixed plates are in clearance fit with the rotating member.

7. The foldable apparatus of claim 6, wherein the two ends of the rotating limit pin respectively penetrate through the two fixed plates, and the rotating limit pin is detachably connected with the two fixed plates.

8. The foldable apparatus of claim 2, wherein the rotating limit pin has two opposite curved mating surfaces, and the curved sliding groove has two curved guide surfaces in fit with the two curved mating surfaces respectively.

9. The foldable apparatus of claim 1, wherein the housing defines a limit sliding groove extending linearly, one end of the limit connecting member is in sliding fit with the limit sliding groove, and the other end of the limit connecting member is rotatably connected with the rotating shaft base.

10. The foldable apparatus of claim 9, wherein the rotating shaft base is provided with a synchronous transmission assembly, and the synchronous transmission assembly is connected with the two limit connecting members to enable the two main bodies to synchronously rotate relative to the rotating shaft base.

11. The foldable apparatus of claim 10, wherein the rotating shaft base is provided with two bearing blocks, the rotating members of the two main bodies are rotatably connected with the two bearing blocks respectively, a gap is defined between the two bearing blocks, an end of the limit connecting member rotatably connected with the rotating shaft base is located within the gap, and the synchronous transmission assembly is located within the gap.

12. The foldable apparatus of claim 1, wherein the rotating shaft base defines rotating shaft grooves, each rotating shaft groove defines a rotating guide groove at an inner wall of the rotating shaft groove, the rotating member has a rotating wheel at an end of the rotating member away from the housing, the rotating wheel is in rotating fit with the rotating shaft groove, and the rotating wheel has a rotating guide flange at an outer wall of the rotating wheel and in fit with the rotating guide groove.

13. The foldable apparatus of claim 12, wherein an edge of the second support plate away from the first support plate slides relative to the rotating shaft base along the inner wall of the rotating shaft groove, during a folded process of the two main bodies from an unfolded state to a folded state.

14. The foldable apparatus of claim 13, wherein the rotating members of the two main bodies are arranged in alternation at two opposite sides of the rotating shaft base, the rotating shaft base defines avoiding grooves each at one side of a corresponding rotating shaft groove facing a main body at another side, and the avoiding groove is for the edge of the second support plate away from the first support plate to retract relative to a bottom of the rotating shaft base.

15. The foldable apparatus of claim 14, wherein each rotating guide groove communicates with a corresponding avoiding groove.

16. An electronic device, comprising:
a foldable apparatus, wherein the foldable apparatus comprises a rotating shaft base and two main bodies disposed at two opposite sides of the rotating shaft base, each main body is provided with a rotating member rotatably connected with the rotating shaft base, a housing rotatably connected with the rotating member, a first support plate fixed to the housing, and a second support plate fixedly connected with the rotating member; and
a flexible display screen, wherein the flexible display screen has two parts which are able to be folded or unfolded relative to each other and a bendable part connected between the two parts, and the two parts are respectively fixed to the two main bodies; wherein,
when the two main bodies are folded relative to each other, two housings respectively drive two first support plates to stack relative to each other, and the second support plate rotates relative to the housing along with the rotating member to be inclined relative to the first support plate, and an accommodating space is defined between two second support plates;
when the two main bodies are unfolded relative to each other, the two housings respectively drive the two first support plates to be flush with each other, and the second support plate rotates relative to the housing along with the rotating member to be flush with the first support plate; and
when the two main bodies are folded relative to each other, the two first support plates respectively drive the two parts to fold, and the bendable part is accommodated in the accommodating space between the two second support plates;
wherein each main body is further provided with a limit connecting member rotatably connected with the rotating shaft base and slidably connected with the housing, and two limit connecting members are configured to respectively limit rotation of the two main bodies within an included angle range which is from being folded to being unfolded relative to each other.

17. The electronic device of claim 16, wherein the main body has a first edge and a second edge opposite to the first edge, the second edge is adjacent to the rotating shaft base, the two parts comprise a first part and a second part, and two first edges are respectively connected with the first part and the second part.

18. The electronic device of claim 17, wherein the two first edges are fixedly connected with an edge of the first part and an edge of the second part respectively.

19. The electronic device of claim 17, wherein the two first edges are slidably connected with an edge of the first part and an edge of the second part respectively.

* * * * *